(12) United States Patent
Schempp et al.

(10) Patent No.: US 7,266,883 B2
(45) Date of Patent: Sep. 11, 2007

(54) METHODS FOR THE PRODUCTION OF A PRESSURE PIPE OF AN ELECTRIC HOISTING MAGNET AND PRESSURE PIPE OF A HOISTING MAGNET

(75) Inventors: Roland Schempp, Vaihingen (DE); Uwe Baerenwaldt, Freiberg (DE); Hermann Sanzenbacher, Schwieberdingen (DE)

(73) Assignee: Bosch Rexroth AG, Stuttgart (DE)

( * ) Notice: Subject to any disclaimer, the term of this patent is extended or adjusted under 35 U.S.C. 154(b) by 324 days.

(21) Appl. No.: 10/501,063

(22) PCT Filed: Feb. 7, 2003

(86) PCT No.: PCT/DE03/00351

§ 371 (c)(1),
(2), (4) Date: Jul. 9, 2004

(87) PCT Pub. No.: WO03/072954

PCT Pub. Date: Sep. 4, 2003

(65) Prior Publication Data

US 2005/0068136 A1    Mar. 31, 2005

(30) Foreign Application Priority Data

Feb. 22, 2002 (DE) ............... 102 07 438
Sep. 18, 2002 (DE) ............... 102 43 165

(51) Int. Cl.
    *H01F 7/06* (2006.01)
(52) U.S. Cl. .............. 29/607; 335/281; 251/129.15
(58) Field of Classification Search ........ 335/255, 335/281; 251/129.15; 29/607
    See application file for complete search history.

(56) References Cited

U.S. PATENT DOCUMENTS

| 4,004,343 | A | 1/1977 | Marsden |
| 4,553,735 | A | 11/1985 | Brundage |
| 6,217,001 | B1 | 4/2001 | Palmer |

FOREIGN PATENT DOCUMENTS

| DE | 197 07 587 | 8/1998 |
| DE | 100 08 958 A | 8/2001 |
| EP | 1 118 518 A | 7/2001 |
| WO | 98 402 60 A | 9/1998 |

*Primary Examiner*—Ramon M. Barrera
(74) *Attorney, Agent, or Firm*—Michael J. Striker

(57) ABSTRACT

The invention discloses methods for the production of pressure pipes of a tractive solenoid for a hydraulic valve and pressure pipes that are manufactured using these methods, wherein the pressure pipes are thermally joined.

6 Claims, 3 Drawing Sheets

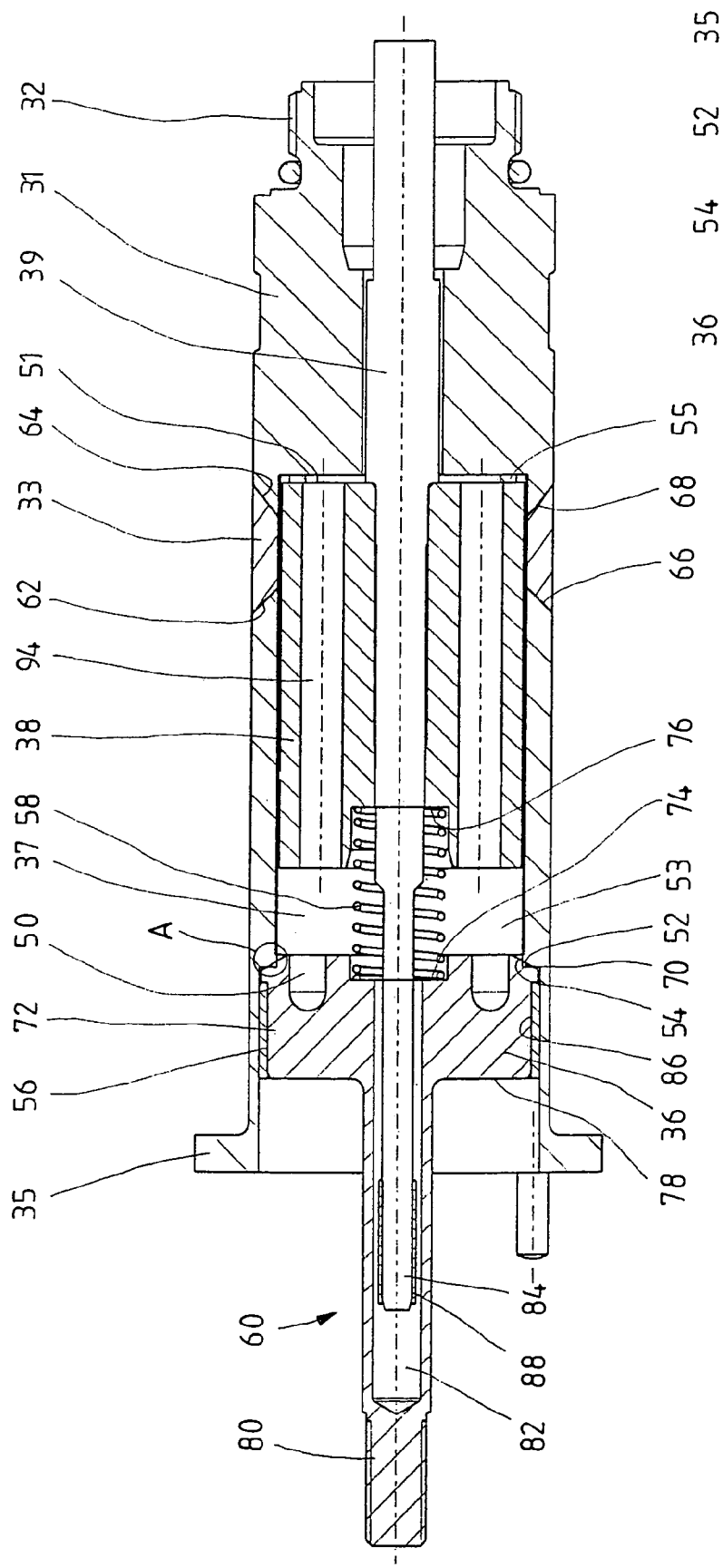
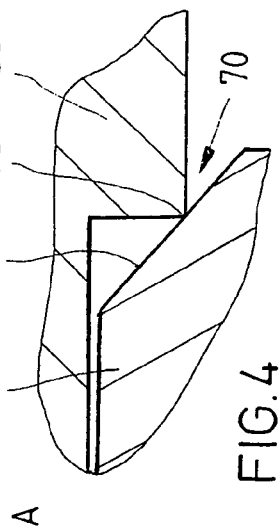
FIG. 3
FIG. 4

METHODS FOR THE PRODUCTION OF A PRESSURE PIPE OF AN ELECTRIC HOISTING MAGNET AND PRESSURE PIPE OF A HOISTING MAGNET

BACKGROUND OF THE INVENTION

The invention relates to a method for the production of a pressure pipe of a tractive solenoid for a hydraulic valve, and to a pressure pipe of a tractive solenoid for a hydraulic valve.

A pressure pipe of this kind is known from DE 197 07 587 A1 and is a component of a pressure-tight tractive solenoid, which, in addition to the pressure pipe, has a coil for actuating an armature, which is contained so that it can move axially in a receptacle of the pressure pipe, with the coil encompassing the pressure pipe. The pressure pipe includes a pole piece that can be screwed to a valve body by means of an internal thread, a nonmagnetic intermediate piece, and a tubular piece adjoining this, which is closed at the end oriented away from the pole piece by means of a component serving as a stroke limiter. The pole piece, the intermediate piece, the tubular piece, and the stroke limiter delimit the receptacle for the armature that cooperates with the coil. The armature is connected to a tappet, which extends through the pole piece in the axial direction and serves to actuate a valve slider of the hydraulic valve. The nonmagnetic intermediate piece serves to divert the magnetic flux into the armature.

The nonmagnetic intermediate piece is usually built into the pressure pipe through the use of a manufacturing method such as a bronze weld cladding process or the soldering-in of austenitic steel. When methods like these are used, it is necessary for the pressure pipe to be finished on an inner wall delimiting the receptacle through the use of a material-removing cutting process in order to produce a sliding surface for the armature. This is disadvantageous insofar as the material-removing cutting process not only lengthens manufacturing time but also increases production costs.

It is also known to produce the nonmagnetic intermediate piece or the nonmagnetic zone through partial structural transformation of the work piece that constitutes the pressure pipe. But it is disadvantageous that the structural transformation requires a large technical setup as well as a very sensitive control of the structural transformation apparatus in order to produce an intermediate piece with the desired structure.

In the above-mentioned methods for producing the nonmagnetic zone, because of the temperatures that occur, the armature and other components contained in the receptacle such as antistick washers and the tappet are inserted into the receptacle only after the joining process and the finishing of the connecting region between the pole piece and the intermediate piece and between the intermediate piece and the tubular piece. Only then it is the receptacle closed by means of the stroke limiter. This closing is usually produced by means of a crimping process.

A disadvantage to this method is that the stroke limiter is joined to the pressure pipe by means of a crimping process. The internal compression stress that occurs in the receptacle region changes the position of the stroke limiter so that a pressure-tight, sealed operation and a fixed seat are no longer assured. This is primarily due to wear on the edges inside the crimp with each change in pressure.

Particularly in pressure pipes with an integrated path-measuring device for measuring the path of a slider, a position change of the stroke limiter is disadvantageous because the position change shifts the zero point and consequently distorts the measuring results.

Another disadvantage of the method is that the stroke limiter is physically separate from the pressure pipe so that these two components must always be joined by means of a joining step.

SUMMARY OF THE INVENTION

The object of the current invention is to finish a method that remedies the above-mentioned disadvantage as well as pressure pipes, which, through the use of this method, are produced easily and inexpensively in terms of the technical equipment required.

This object is attained by a method, by a first pressure pipe and by a second pressure pipe according to the invention.

The method according to the invention for producing a pressure pipe of a tractive solenoid for a hydraulic valve, to the which method is used to thermally join the ends of the intermediate piece to both the pole piece and the tubular piece, preferably in a single work segment, so that after they are joined, a sliding surface for the armature is formed has the advantage that it is no longer necessary to finish the walls of the receptacle region for the armature by means of expensive material-removing cutting processes since the connection between the intermediate piece and the tubular piece and between the pole piece and the intermediate piece is produced exclusively by means of the respective end surfaces of the components that are oriented toward one another. This provides a sliding surface for the amiature. Correspondingly, it is also no longer necessary to dress the outer circumference of the pressure pipe or to finish it using a material-removing cuffing process since here, too, there are no material residues after the joining of the individual pieces.

According to an advantageous embodiment of the method according to the invention, the intermediate piece is welded to the pole piece and the tubular piece, preferably using a capacitor discharge welding process. Capacitor discharge welding allows the components to be attached to one another without annealing and distortion. The components maintain their dimensional precision even after the welding process. The precise positioning of the components in relation to one another is maintained. This welding process also makes it possible to join different materials to each other.

By using a thermal method such as capacitor discharge welding (CDW), in which only a narrow zone is heated in the components to be joined, it is possible to insert the armature into the receptacle region before the pole piece, the annular component, and the tubular piece are joined to one another. This is naturally also true for other components that are to be placed in the receptacle, e.g. antistick washers, and for a tappet connected to the armature.

By using capacitor discharge welding, it is likewise possible, according to the invention, to thermally join the stroke limiter to the tubular piece, thus making it possible to dispense with conventional crimping methods.

The use of capacitor discharge welding produces a static connection between the tubular piece and the stroke limiter, thus preventing the stroke limiter from slipping during operation. Moreover, the welded connection between the tubular piece and the stroke limiter is not only pressure-tight, but also sealed so that O-rings or other sealing aids can be eliminated. Additionally, since capacitor discharge welding does not require the cleaning that is necessary for soldering or laser welding, the process can be executed quickly and inexpensively.

In a method according to the invention for producing a pressure tube according to the invention, first the tubular piece, the intermediate piece, and the pilot piece are joined in a receptacle device. The joining process can be executed in a conventional manner or in the manner according to the invention through the use of a capacitor discharge welding process. After the joining process, the armature, preferably with the tappet and including the spring, is positioned in the receptacle and then this receptacle is closed through the insertion of the stroke limiter. The stroke limiter rests with its circumference edge against a radially inner beveled surface of the tubular piece. According to the invention, the stroke limiter is thermally attached to the tubular piece in the region of the circumference edge and the beveled surface in a pressure-tight, sealed fashion through the formation of an annular seam, in particular by means of capacitor discharge welding.

By using the method according to the invention, it is also possible to embody the stroke limiter and the tubular piece as being of one piece. This allows all of the components of the stroke magnet, i.e. the pole piece, the nonmagnetic intermediate piece, the tubular piece with the stroke limiter, the armature, the tappet, the antistick washers, etc. to be put together or assembled and then joined to one another thermally in a single work segment. No finishing work is required. Instead, a finished pressure pipe is produced, which can be connected to a coil and housing of a hydraulic valve.

In another method that is preferably used with a pressure pipe, in which the stroke limiter is embodied as being of one piece with the tubular piece, when the pressure pipe is fitted together in a receptacle device of a capacitor discharge welding apparatus, the assembled individual parts are fixed on the outer diameter of the tube and are thus centered. The stroke limiter is suitably disposed at the bottom so that the pole piece, the intermediate piece, and the tubular piece are vertically aligned. The force of gravity causes the armature to rest against the supporting surface of the stroke limiter and therefore optionally also against a supporting surface of an emergency hand bolt contained in the stroke limiter. This produces a distance between the armature and the weld location, which is embodied in the region of the intermediate piece of the pressure pipe, the intermediate piece constituting a nonmagnetic zone. The distance thus produced between the armature and the weld location causes the current that flows during the capacitor discharge welding process to flow not through the armature, but through the locations in the nonmagnetic zone that are to be welded and into the stroke limiter, without the armature constituting a short circuit for the current.

Another subject of the invention is a pressure pipe of a tractive solenoid for a hydraulic valve. The pressure pipe has a pole piece, a nonmagnetic intermediary piece, a tubular piece, a stroke limiter, and a receptacle region for an armature that cooperates with a tappet. The tubular piece and the stroke limiter are embodied as being of one piece and the pole piece, the intermediate piece, and the tubular piece are thermally attached to one another by means of a melting process. This pressure pipe has the advantage of having a small number of components; in particular, as compared to a pressure pipe from the prior art, it is no longer necessary to close the pressure pipe in a separate work step by means of the stroke limiter that is to be connected to the tubular piece.

In order to simplify production, the pressure pipe according to the invention can have centering means in the connecting region between the pole piece and the intermediate piece and between the intermediate piece and the tubular piece, which centering means are comprised, for example, of an annular bead and a corresponding annular groove.

Another preferred pressure pipe has a stroke limiter thermally joined to the tubular piece. According to the invention, a capacitor discharge welding process is used. Preferably, an annular seam is formed along a circumference edge of the tubular piece oriented toward the stroke limiter on the one hand and a radially inner beveled surface of the stroke limiter on the other. Consequently, only a narrow contact region is produced between the stroke limiter and the tubular piece so that the energy required for the thermal joining is introduced in a precisely directed fashion and a definite annular seam can be produced.

The stroke limiter is axially embraced in certain sections by an insulating guide sleeve, which is spaced axially apart from the annular seam.

In order to reduce the forces acting on the welded seam when there is a pressure change, a recess is provided in the end surface of the stroke limiter oriented toward the receptacle. Preferably, the recess is embodied as an annular turned bore in the region of the annular seam, but other embodiments are also conceivable.

It is also conceivable for a path-measuring device, which is designed to measure the respective slider position, to be provided at the end of the stroke limiter.

Other advantages and advantageous embodiments of the subject of the invention can be inferred from the description, the drawings, and the claims.

The invention will be described in detail below in conjunction with schematic depictions.

BRIEF DESCRIPTION OF THE DRAWINGS

FIG. 3 shows a pressure pipe with a stroke limiter that is thermally attached inside the tubular piece, and FIG. 4 shows a detail of a connecting region of the tubular piece with the stroke limiter from FIG. 3.

DESCRIPTION OF THE PREFERRED EMBODIMENTS

Figure 1:
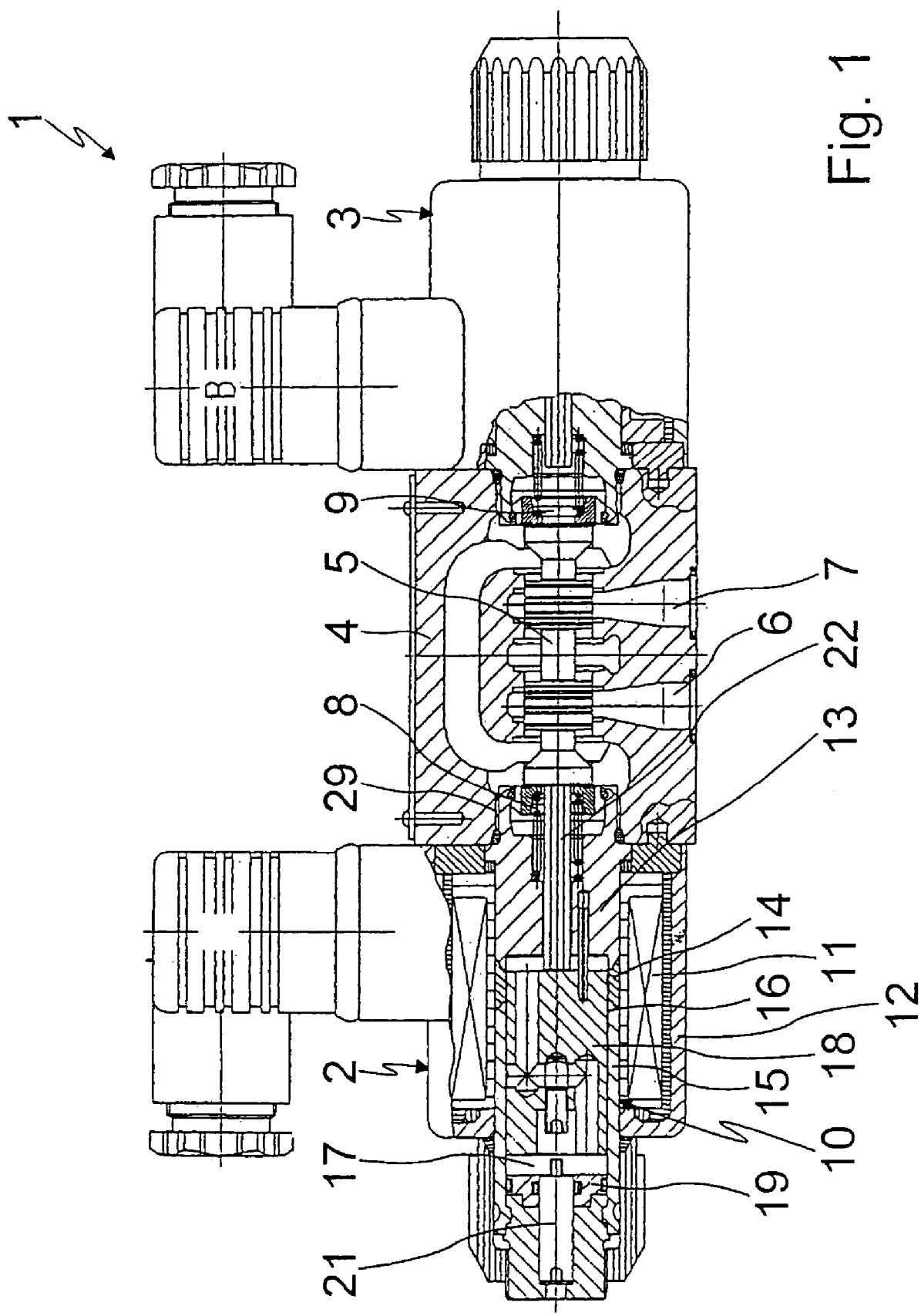
FIG. 1 shows a hydraulic valve with a conventional pressure pipe of a tractive solenoid.

FIG. 1 is a longitudinal section through a hydraulic directional valve 1, which is designed for industrial uses, is embodied in the form of a slider, and is controlled directly. For actuation, the directional valve 1 has two pressure-tight tractive solenoid devices 2 and 3 that can be activated electrically.

The hydraulic directional valve 1 is embodied with a valve housing 4 that contains an axially movable control slider 5, which can control a fluid flow in the directional valve 1. The drawing shows a first valve connection 6 and a second valve connection 7.

Two restoring devices 8 and 9 hold the control slider 5 centered in the so-called middle position shown in FIG. 1 and the tractive solenoid devices 2 and 3 disposed at both ends of the valve housing 7 in the axial direction can displace this control slider 5 into so-called working positions at both ends.

In the embodiment shown, the tractive solenoid devices 2 and 3 are structurally identical. This is why the description below mentions only the tractive solenoid device 2.

The tractive solenoid device 2 is embodied as a simply functioning, pressure-tight tractive solenoid and has a pressure pipe 10 that is aligned coaxial to the control slider 5 and supports a magnet coil 11, which is bounded by a coil housing 12.

The pressure pipe 10 has a sleeve-shaped pole piece 13 provided with a central thread 29 by means of which the pressure pipe 10 is screwed to the valve housing 4. At its end oriented away from the valve housing 4, the pole piece 13 abuts a nonmagnetic intermediary piece 14, which in turn abuts a tubular piece 15. The pole piece 13, the intermediate piece 14, and the tubular piece 15 form a sliding surface 16 for an armature 18, which is disposed in a receptacle 17 of the pressure pipe 10, cooperates with the magnet coil, and is designed to slide axially.

The armature 18 is connected to a tappet 22, which extends through the pole piece 13 and is used to actuate the valve slider 5.

At its end oriented away from the valve housing 4, the receptacle 17 is closed by a stroke limiter 19, which is connected to the tubular piece 15. The cap-like stroke limiter 19 also has an emergency hand bolt 21 that makes it possible, if necessary, for the armature 18 to be slid axially in the receptacle 17 by hand from the outside, thus actuating the control slider 5 of the valve 1.

In the pressure pipe 10, the nonmagnetic intermediary piece 14 is comprised of bronze, which is welded between the pole piece 13 and the tubular piece 15.

Figure 2:
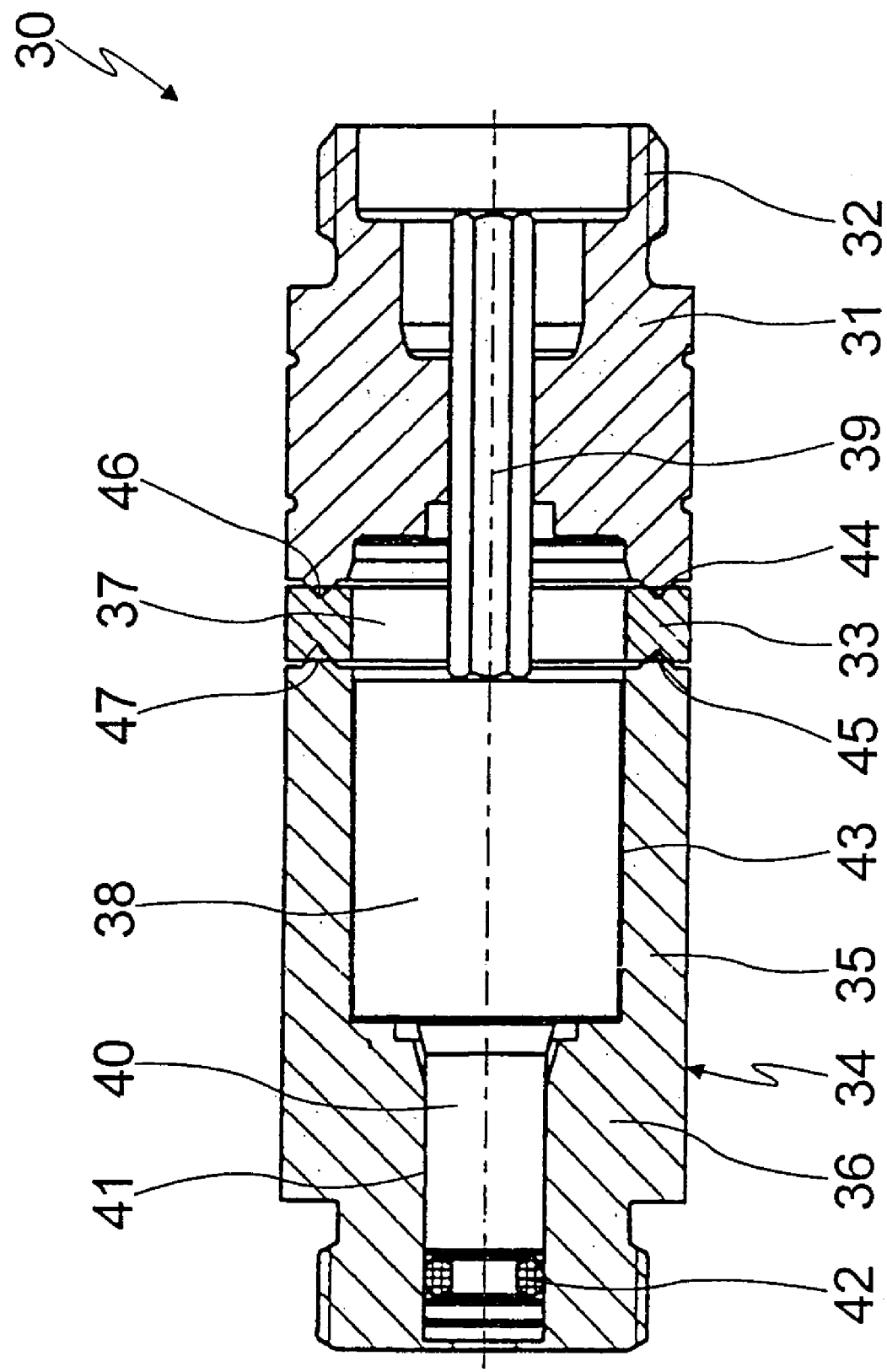
FIG. 2 shows a pressure pipe with a one-piece tubular piece and a stroke limiter.

FIG. 2 shows a pressure pipe 30 with a tubular piece 35 that has an integrated stroke limiter 36, which is for installation in a hydraulic valve of the kind shown in FIG. 1 and is therefore a component of a tractive solenoid device.

The pressure pipe 30 is comprised of a pole piece 31 provided with a central thread 32 by means of which the pressure pipe 30 can be attached to a valve housing.

At its end oriented away from the central thread 32, the pole piece 31 abuts a nonmagnetic intermediary piece 33, which is embodied in the form of a ring and on its end surface oriented away from the pole piece 31, abuts a cup-shaped component 34 that is comprised of a hollow, cylindrical tubular piece 35 and a partial region 36 comprising a stroke limiter. The pole piece 31, the intermediate piece 33, and the cup-shaped component 34 delimit a receptacle 37 for an armature 38, which cooperates with a magnet coil not shown in FIG. 2.

The armature 38 is connected to a tappet 39, which extends axially through the pole piece 31 and is used to actuate the control slider of the hydraulic valve.

In addition, the cup-shaped component 34 contains an emergency hand bolt 40, which is guided so that it can move axially in a bore 41, is sealed along its circumference by means of an O-ring 42, and rests against the armature 38 when the armature is in the position shown in FIG. 2.

At its end surfaces, the nonmagnetic intermediary piece 33 is thermally joined to the pole piece 31 on one side and to the cup-shaped component 34 on the other, using a capacitor discharge welding process, thus producing a sliding surface 43 for the armature 38. When the components are joined, energy is introduced into them, which produces a circumferential welded connection between the respective components. In the process of this, the components are positioned in an adjusting device so that the cylindrical inner surfaces of the tubular piece 35 and the intermediate piece 33 are precisely flush. After the joining process, the sliding surface 43 does not require any finishing work.

The sliding surface 43 includes the inner cylindrical surface of the tubular partial region 35 of the component 34 and the inner cylindrical surface of the intermediate piece 33. The pole piece 31, the intermediate piece 33, and the cup-shaped component 35 are joined to one another after the armature 38 has been inserted into the receptacle 37, i.e. after the pressure pipe has been completely assembled and immobilized.

In order to assure a precise centering of the individual components in relation to one another during the joining process, each of the end surfaces of the annular intermediate piece 33 is provided with an annular groove 44, 45, which is engaged by an annular bead 46, 47 on the corresponding end surface of the pole piece 31 or the cup-shaped component 35. Alternatively, the individual components can be centered by the welding apparatus used.

FIG. 3 shows a pressure pipe 30 with a stroke limiter 36 thermally attached inside a tubular piece 35 and with an integrated path-measuring device 60 for determining the slider position.

As in the preceding embodiment form according to FIG. 2, the pressure pipe 30 has a tubular piece 35, a nonmagnetic intermediary piece 33, a stroke limiter 36, and a pole piece 31 with a central thread for attaching the pressure pipe 30 in a valve housing (not shown).

The intermediate piece 33 is disposed between the ends of the tubular piece 35 and the pole piece 31 and is attached to them, thus producing a receptacle 37 for containing an armature 38. The armature 38 divides the receptacle 37 into two subspaces 51, 53, which communicate via through bores 94 provided in the armature 38. In order to simplify production, the end surfaces 62, 64 of the intermediate piece 33 are embodied as inversely conical and the opposing end surfaces 66, 68 of the tubular piece 35 and the pole piece 31 are embodied with corresponding mated contours.

The receptacle 37 is delimited axially by the pole piece 31 and the stroke limiter 36. In the receptacle, a spring 58 that is supported against the stroke limiter 36 prestresses the armature 38 supported on a tappet 39 into the starting position against a contact ring 55 of the pole piece 31. To secure it in position, the spring 58 is inserted into recesses 74 provided in the end surfaces of the stroke limiter 36 and armature 38.

In contrast to the embodiment form described previously, however, the stroke limiter 36 is not embodied as being of one piece with the tubular piece 35, but is instead inserted into the tubular piece 35 and thermally joined to it. Preferably, the tubular piece 35 is comprised of a soft magnetic steel, whereas the stroke limiter 36 is comprised of a nonmagnetizable austenitic steel.

The tubular piece 35 is widened radially in the region of the stroke limiter 36, which forms a circumference edge 52 (FIG. 4). A beveled surface 54 at the end of the stroke limiter 36 rests against this circumference edge 52. The tubular piece 35 and the stroke limiter 36 are thermally joined in the region of the circumference edge 52/beveled surface 54 so that an annular seam 70 is formed along which the stroke limiter 36 is connected to the tubular piece 35 in a pressure-tight, sealed fashion. The contact of the circumference edge 52 against the beveled surface 54 produces a relatively narrow contact region so that the energy required for the thermal joining process can be introduced in a precisely directed fashion and the annular seam 70 can be optimally embodied. According to the invention, the thermal joining is produced using the capacitor discharge welding process.

In order to reduce the compression stresses acting on the annular seam 70 from the receptacle side, an axial turned bore 50 is provided on the end of the stroke limiter 36, in the vicinity of the annular seam 70 (FIG. 3). This turned bore 50 makes it possible to considerably reduce the mechanical stresses in the vicinity of the annular seam 70, thus positively reducing the susceptibility of the annular seam to cracking and fracturing.

Preferably, a middle region 72 of the stroke limiter 36 oriented away from the receptacle 37 is radially indented so as to produce an annular recess 86 that is spaced axially apart from the weld region and serves to contain an insulating guide sleeve 56.

The path-measuring device 60 has a radially indented bolt-shaped body 80 on the end surface 80 of the stroke limiter 36 oriented away from the receptacle 37, with a blind hole bore 82 extending from the receptacle 37 and through the stroke limiter 36. This blind hole bore 82 receives the elongated free end section 84 of the tappet 39, which plunges to different depths in the blind hole bore 82 depending on the slider position or armature position.

Preferably, the path measurement of the slider (not shown) is executed in accordance with the inductive principle, the free end section 84 of the tappet 39 being encompassed by an annular ferrite core 88 so that a path-dependent induced voltage can be measured by means of a differential throttle or a differential transformer.

The applicant reserves the right to submit a coordinate claim directed to the thermal joining of the stroke limiter to a tubular piece according to the invention through the use of a capacitor discharge welding process.

In a preferred method for producing the pressure pipe according to the invention, first, the tubular piece 35 is attached to the intermediate piece 33 and the pole piece 31 in a receptacle device. Preferably this is executed by means of a capacitor discharge welding process. Then the armature, preferably with the tappet 39 and including the spring 58, is positioned in the receptacle 37. The stroke limiter 36 is inserted into the tubular piece until it comes to rest with its circumference edge 52 against the beveled surface 54 of the tubular piece 35. In a last work step, the stroke limiter is then thermally attached in the region of the circumference edge 52 and the beveled surface 54 through the formation of an annular seam 70 according to the invention by means of capacitor discharge welding.

The invention has disclosed methods for producing pressure pipes of a tractive solenoid for a hydraulic valve as well as pressure pipes that are produced using this method, wherein the pressure pipes are thermally joined.

REFERENCE NUMERAL LIST 1 directional valve
2 tractive solenoid device
3 tractive solenoid device
4 valve housing
5 control slider
6 valve connection
7 valve connection
8 restoring device
9 restoring device
10 pressure pipe
11 magnet coil
12 coil housing
13 pole piece
14 intermediate piece
15 tubular piece
16 sliding surface
17 receptacle
18 armature
19 stroke limiter
21 emergency hand bolt
22 tappet
29 central thread
30 pressure pipe
31 pole piece
32 central thread
33 intermediate piece
34 component
35 tubular piece
36 stroke limiter
37 receptacle
38 armature
39 tappet
40 emergency hand bolt
41 bore
42 O-ring
43 sliding surface
44 annular groove
45 annular groove
46 annular bead
47 annular bead
50 turned bore
51 subspace
52 circumference edge
53 subspace
54 beveled surface
55 contact ring
56 guide sleeve
58 spring
60 path-measuring device
62 end surface
64 end surface
66 end surface
68 end surface
70 annular seam
72 middle region
74 recess
76 recess
78 end surface
80 bolt-like body
82 blind hole bore
84 free end section
86 annular recess
88 ferrite core
94 through bore

The invention claimed is:

1. A method for producing a pressure pipe of a tractive solenoid for a hydraulic valve, which pressure pipe has a pole piece (31), a nonmagnetic intermediary piece (33), a tubular piece (35), and a stroke limiter (36), and has a receptacle (37) for an armature (38) that cooperates with a tappet (39), characterized in that the nonmagnetic intermediary piece (33) is thermally joined at its ends to the pole piece (31) and the tubular piece (35) in such a way that after the joining, a sliding surface (43) for the armature (38) is formed, and in that the armature (38) is introduced into the receptacle region (37) before the pole piece (31), the intermediate piece (33), and the tubular piece (35) are joined to one another.

2. The method according to claim 1, characterized in that the intermediate piece (33) is welded to the pole piece (31) and the tubular piece (35).

3. The method according to claim 2, characterized in that a capacitor discharge welding process is used.

4. The method according to claim 1, characterized in that the pole piece (31), the intermediate piece (33), and the tubular piece (35) are vertically aligned during the joining process.

5. The method according to claim 1, characterized in that the stroke limiter (36) is thermally joined to the tubular piece (35).

6. The method according to claim 1, characterized in that the stroke limiter (36) and the tubular piece (35) are made of one piece.

* * * * *